United States Patent [19]
Albin

[11] Patent Number: 5,002,014
[45] Date of Patent: Mar. 26, 1991

[54] ANIMAL MATTRESS

[76] Inventor: Steve Albin, 8547 Franjo Rd., Miami, Fla. 33189

[21] Appl. No.: 495,753

[22] Filed: Mar. 19, 1990

[51] Int. Cl.$^5$ ............................................. A01K 29/00
[52] U.S. Cl. ..................................... 119/28.5; 5/420; 5/468
[58] Field of Search .................... 119/1, 15, 19; 5/435, 5/441, 468, 420

[56] References Cited

U.S. PATENT DOCUMENTS

| | | | |
|---|---|---|---|
| 3,323,151 | 6/1967 | Lerman | 5/420 |
| 3,902,456 | 9/1975 | David | 119/1 |
| 4,163,297 | 8/1979 | Neumark | 5/446 |
| 4,606,087 | 8/1986 | Alivizatos | 5/424 |

FOREIGN PATENT DOCUMENTS

86/00781 2/1986 PCT Int'l Appl. ................. 119/1

Primary Examiner—John G. Weiss
Attorney, Agent, or Firm—Malloy, Downey & Malloy

[57] ABSTRACT

An animal mattress for bedding an animal comprising an outer casing of a mesh material woven from individual polyester strands coated with a polyvinyl chloride material impervious to liquid and heat; the casing includes a hollow interior chamber and a zipper opening on a side thereof to allow access to the interior chamber. A cushioning material, including individual, heat expanded polystyrene beads are disposed in loose, free flowing relation within the interior chamber, wherein a stitch sewn in the center of the casing connecting an upper and lower side acts as a baffle in the chamber to regulate the flow of the beads while also forming a nest-like configuration in the mattress for an animal to lie in a comfortable position.

4 Claims, 1 Drawing Sheet

ANIMAL MATTRESS

BACKGROUND OF THE INVENTION

1. Field of the Invention

An animal mattress formed from an extremely durable, light-weight material which is impervious to liquid and the absorption of heat and including a cushion material contained within an outer casing specifically adapted to provide a dry, comfortable resting surface which evenly distributes an animal's weight throughout the surface of the mattress.

2. Description of the Prior Art

There are numerous animal mattresses in the prior art which are used to provide a comfortable resting surface for an animal to lie on. Most of the animal mattresses in the prior art include an outer casing or shell structure formed from a cotton blend or polyester blend material, wherein the casing is filled with a cushioning material of either cotton, polyester, or foam. While these mattresses may provide a comfortable resting surface for the animal, they also absorb quite a bit of liquid including rain water, urine, animal saliva, and various other spilled substances to the point where the mattress becomes saturated and begins to deteriorate or rot. Once these mattresses become saturated with such liquids, it is extremely difficult and sometimes impossible to thorough clean them.

Over a period of time, the mattresses, begin to promote bacterial growth due to the build up of moisture and heat. This, in turn, leads to an extremely unhealthy environment for the animal to be lying on, and often causes severe rashes and other related skin conditions.

Another problem associated with the mattresses of the prior art is the nesting of fleas and ticks within the cushioning material of the mattress. As these mattresses absorb water and other organic substances, they begin to develop into an ideal environment for fleas and ticks to live for extended periods of time. The body heat absorbed from the animal lying thereon also provides an excellent breeding environment for fleas, ticks, and other parasites which eventually attack the animal lying on the mattress.

In addition to the mattresses having a cotton blend or polyester blend outer casing, there are also mattresses which have vinyl casings or other similar material which is resistant to the penetration of water or other liquids. However, these mattresses still retain puddles of liquid on the resting surface and also absorb quite a bit of heat from the animal's body. Thus, if an animal such as a dog urinates on the mattress, the urine will be absorbed into the dog's coat instead of the mattress and, in any event, will create an unhealthy environment for the animal to lie in.

Accordingly, there is still a need in the animal care industry for a mattress which is extremely durable, light-weight, easy to clean, and structured so as to allow liquids, including urine, to pass therethrough without the mattress absorbing either moisture or heat.

SUMMARY OF THE INVENTION

The present invention is directed towards an animal mattress formed from an extremely durable, light-weight material including an outer mesh casing and a cushion filling comprised of heat expanded, polystyrene beads. The outer casing is formed from individual polyester strands which are first coated with a polyvinyl chloride material and thereafter woven to form a mesh material having small openings between the strands. The polyvinyl chloride coating forms a protective shell around the individual strands making them impervious to liquid, wherein liquid spilled on the fabric simply passes through the openings of the mesh, exiting the bottom of the mattress.

The mattress casing includes an upper and lower side and a hollow interior chamber with a zipper opening on one side of the casing to allow access to the chamber. The interior chamber is partially filled with the heat expanded polystyrene beads which flow loosely within the chamber, leaving enough room for the beads to flow in response to pressure applied to the exterior of the mattress. In this manner, the mattress is better able to conform to the animal's body configuration, thus distributing the animal's weight more evenly with no pressure points on any particular area of the animal's body.

A stitch sewn in the center of the mattress, connecting the upper side to the lower side, acts as a baffle interrupting the space in the interior chamber so as to regulate the flow of the beads therein. The stitch can be varied in length so as to achieve the desired free flow affect of the beads in response to pressure exerted on the exterior of the mattress.

The animal mattress in the preferred embodiment of the present invention is specifically designed to be extremely durable, light-weight and easy to clean. In use, after a period of time, or whenever the need arises, the mattress can be cleaned simply by rinsing the outer casing with a stream of water, preferably using a garden hose. During rinsing, the water simply passes through the openings in the outer mesh casing and rinses the exterior surfaces of the polystyrene beads removing any dirt or odorous substances and thereafter passes through and exists the opposite side of the mattress. Since neither the exterior casing nor the polystyrene beads absorb any liquid or odor, a simple rinsing action is effective in cleaning the entire mattress. Thus, even urine passes through the outer casing and between the polystyrene beads with no absorption or odor retention after cleaning. In this manner, an animal resting on the mattress will always have a dry, clean, comfortable resting surface which keeps the animal's coat clean and odor free. Further, the dry surface prevents the animal from developing severe skin conditions such as heat spots, fungus, and other skin disorders which develop from prolonged exposure to heat and moisture.

Another advantage of the present invention arises from the fact that the mattress is made entirely from inorganic materials providing an environment in which parasites such as fleas and ticks cannot survive because neither the exterior casing nor the inner cushioning of polystyrene beads retain water or other liquid substances. Thus, fleas and ticks nested within the mattress have no food substances to survive on, making their life span within the mattress extremely short. Furthermore, because the mattress material creates such a non-livable environment, fleas and ticks are not able to reproduce and, thus, the problem of infestation is eliminated.

Another important advantage of the present invention is that it is perfectly suited for use with show dogs. The exterior casing, being coated with polyvinyl chloride, provides an extremely smooth surface which, unlike animal mattresses in the prior art, does not catch or break the dog's hair when brushed across the mattress surface. Another common problem with the mattresses in the prior art is that the dog's coat often becomes stained from urine just prior to being shown in competition. If this occurs, the dog owner is forced to withdraw his dog from the competition because of the unsightly appearance of the animal's coat. The animal mattress in the preferred embodiment of the present invention is specifically designed to eliminate this problem. If a show dog lying on the mattress of the present invention was to urinate, the urine would simply pass through the woven mesh fabric of the exterior casing and through the cushioning material, exiting the mattress through the lower side without any absorption in the casing or interior cushioning. Thus, the upper resting surface of the mattress always remains dry and clean so that even if the dog was to urinate just prior to being shown in competition, its coat would not be stained or damaged in any way.

In addition to the above-noted advantages of the present invention, the animal mattress in the preferred embodiment provides an excellent resting surface for animal's recovering from surgery. With the polystyrene beads disposed in loose, free flowing relation within the interior chamber of the mattress, the cushioning material is able to conform to the animal's exterior configuration resulting in an even distribution of the animal's weight with no direct pressure points to any particular area of the animal's body. This type of resting surface is ideal in that it improves the animal's blood circulation and enhances post operative recovery after major surgery. Thus, the chances of trauma during recover are significantly reduced and the animal will most likely recover in a shorter period of time.

Because the animal mattress of the present invention is made entirely of inorganic material which is impervious to both liquid and heat, bacterial growth in the mattress is non-existent. This is due to the fact that neither liquid nor heat are retained in the inorganic mattress material and therefore there is little, if any, opportunity for bacteria to grow in the mattress.

An additional advantage of the present invention over the mattresses of the prior art is the ability to transport large quantities of the mattress in a collapsed mode which increases the volume of units which can be shipped in one load. By separating the exterior casings from the cushioning material, the exterior casings and the polystyrene beads can be shipped more efficiently in bulk and thereafter easily assembled at their point of destination.

Because the mattress is formed from entirely liquid impervious materials, the animal mattress can be used effectively either indoors or outdoors. Additionally, the mattress or material is hypoallergenic and, thus, any animal, no matter how sensitive, can use the mattress without experiencing any dermatological complications.

The invention, accordingly, comprises the features of construction, combination of elements, and arrangement of parts which will be exemplified in the construction hereinafter set forth and the scope of the invention will be indicated in the claims.

BRIEF DESCRIPTION OF THE DRAWINGS

For a fuller understanding of the present invention, reference should be had to the following detailed description taken in connection with the accompanying drawings, in which.

Like reference numerals refer to like parts throughout the several views of the drawings.

DETAILED DESCRIPTION OF THE PREFERRED EMBODIMENT

Figure 1:
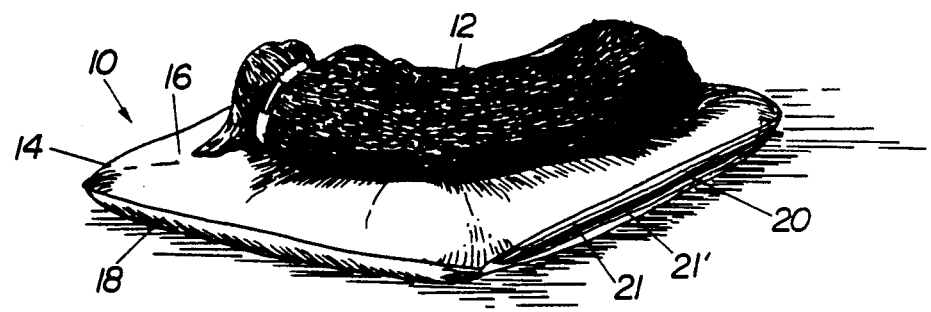
FIG. 1 is a perspective of the animal mattress in a preferred embodiment of the present invention shown in use with a dog lying thereon.

Referring to FIG. 1, the present invention is directed towards an animal mattress generally indicated as 10 being especially suited for bedding an animal, such as a dog 12 in a comfortable position. The animal mattress 10 includes an exterior casing 14 including an upper side 16 and a lower side 18. The exterior casing is formed from a woven, mesh fabric which is coated with a polyvinyl chloride material and will be explained in more detail hereinafter. A zipper 20 is located on one side of the mattress between the upper side 16 and the lower side 18, the zipper being operable between an open or closed position to permit access to the interior of the casing. A protective zipper cover is disposed in overlying relation to the zipper 20 and includes an upper flap 21 and a lower flap 21', each being configured so as to cover at least a portion of the zipper along its entire length.

Figure 2:
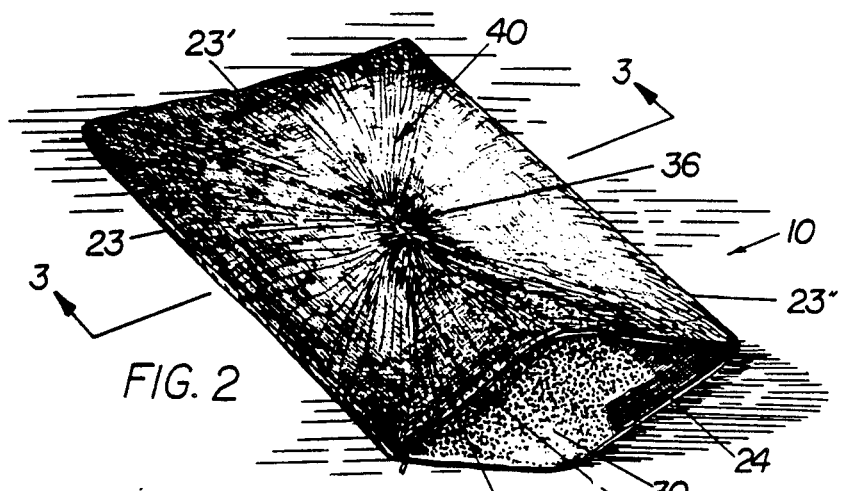
FIG. 2 is a perspective view of the mattress in a preferred embodiment of the present invention illustrating the specific elements of construction.
Figure 3:
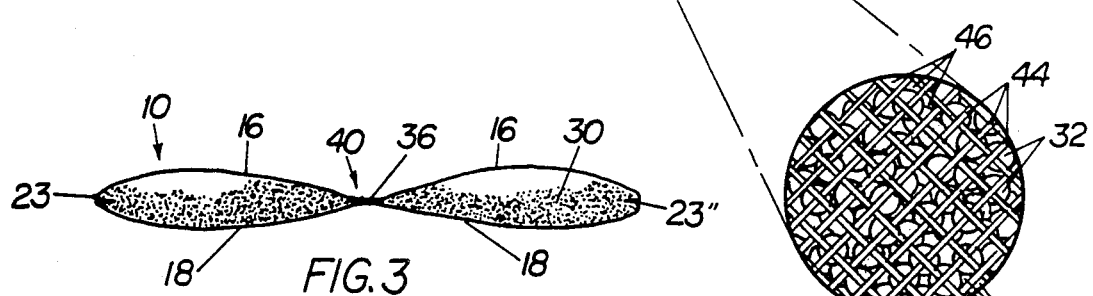
FIG. 3 is a sectional view along lines 3—3 of FIG. 2.

Referring to FIG. 2, the upper and lower sides of the exterior casing 14 are joined along peripheral edges 23' and 23'' so as to form a hollow interior chamber 24 therebetween. A cushioning material 30 is disposed within the hollow interior chamber and in a preferred embodiment, comprises a plurality of relatively small heat expanded, polystyrene beads 32 best illustrated in FIG. 4. In use, the cushioning material is filled within the hollow interior chamber leaving enough open space for the polystyrene beads 32 to move in a loose, free flowing manner in response to the animal's weight on the mattress. To regulate the free flowing effect of the polystyrene beads, the amount of beads can be varied so as to fill more or less space within the interior chamber. To further regulate the free flow effect of the cushioning material, a baffle, preferably in the form of a linear stitch 36, is formed in the center of the mattress connecting the upper and lower sides in such a manner so as to interrupt the hollow interior of the interior chamber 24. The linear stitch 36 is specifically designed to interrupt and, in effect, limit the free flow of the polystyrene beads 32, thereby maintaining a uniform configuration of the mattress 10. The linear stitch 36 further provides a nest-like configuration, generally indicated as 40, in the center of the mattress thereby providing a comfortable contoured surface for the animal to lie on.

Figure 4:
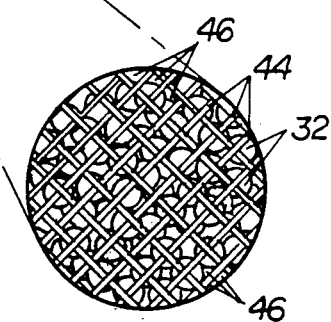
FIG. 4 is a magnified view of the exterior casing of the present invention taken from FIG. 2.

FIG. 4 is a magnified view of the woven mesh fabric of the exterior casing. In viewing FIG. 4, it is seen that the fabric of the outer casing includes a plurality of individual strands 44 woven in such a manner as to leave openings 46 therebetween. The individual strands 44 are formed of polyester and are coated with a polyvinyl chloride material to give them a smooth, protective surface. As seen in FIG. 4, the polystyrene beads 32 have a diameter larger than the openings 46 such that the beads are retained in captivated relation within the hollow interior chamber of the mattress casing.

Now that the invention has been described,
What is claimed is:

1. For use in bedding an animal, an animal mattress comprising:
    an exterior casing formed from a woven, mesh fabric including a plurality of individual strands woven to define spaces therebetween, said strands being formed of a polyester material and having an outer surface coated with a polyvinyl chloride material forming an abrasion-free, smooth finish which is impervious to liquid and heat,
    said exterior casing including a lower side and an upper congruent side disposed in overlying opposing relation to said lower side, said upper and lower sides joined together along correspondingly positioned outer peripheral edges substantially about the periphery of said casing in enclosing relation to a hollow interior chamber,
    cushioning means including a plurality of heat and liquid impervious heat expanded resilient polystyrene beads disposed in loose, free-flowing, captivated relation when in said hollow interior chamber forming a cushion between said lower side and said upper side and adapted to substantially absorb and evenly distribute the weight of an animal resting thereon,
    baffle means including a linear stitch sewn in said casing connecting said upper side and said lower side in substantially spaced, centered relation to said outer periphery forming a nest configuration in the center of the mattress, said linear stitch disposed in interrupting relation to said hollow interior chamber so as to permit and yet regulate the migration of said heat expanded polystyrene beads in response to the animal's weight exerted thereon,
    access mean formed on an end of said casing along a portion of said peripheral edges allowing said lower side and said upper side to be separated in opening, accessible relation to said hollow interior chamber,
    closure means including a zipper attached along said access means, said zipper being operable between an open and closed position to permit access to said hollow interior, and
    a zipper cover formed on an end of said casing along said correspondingly positioned peripheral edges, said zipper cover normally disposed in covering, substantially overlapping relation to said zipper.

2. A mattress as set forth in claim 1 wherein the amount of said plurality of polystyrene beads disposed within said hollow interior can be varied in accordance with a desired cushioning effect.

3. A mattress as set forth in claim 2 wherein the length of said linear stitch can be varied in accordance with a desired increase or decrease in the free flow of said resilient beads.

4. A mattress as set forth in claim 1 wherein said zipper cover includes two oppositely disposed flaps, including a first flap extending from a peripheral edge of said upper side and a second flap extending from a peripheral edge of said lower side and mating with said first flap in covering relation to said zipper.

* * * * *